US008140775B1

(12) United States Patent
Chatterjee et al.

(10) Patent No.: US 8,140,775 B1
(45) Date of Patent: *Mar. 20, 2012

(54) ALLOCATING BACKGROUND WORKFLOWS IN A DATA STORAGE SYSTEM USING AUTOCORRELATION

(75) Inventors: Paresh Chatterjee, Fremont, CA (US); Ajit Narayanan, Chennai (IN); Loganathan Ranganathan, Fremont, CA (US); Sharon Enoch, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 702 days.

This patent is subject to a terminal disclaimer.

(21) Appl. No.: 12/101,241

(22) Filed: Apr. 11, 2008

Related U.S. Application Data (60) Provisional application No. 60/923,226, filed on Apr. 13, 2007.

(51) Int. Cl.
*G06F 12/00* (2006.01)
(52) U.S. Cl. ................. 711/154; 711/170; 711/E12.001
(58) Field of Classification Search .................. 711/154, 711/170, E12.001
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Gooddlander et al. | |
| 5,502,836 A | 3/1996 | Hale et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 6,098,128 A | 8/2000 | Velez-McCaskey et al. | |
| 6,275,898 B1 | 8/2001 | DeKoning | |
| 7,360,051 B2 | 4/2008 | Sugino et al. | |
| 7,404,102 B2 | 7/2008 | Soran et al. | |
| 7,730,531 B2 * | 6/2010 | Walsh | 726/22 |
| 2005/0055402 A1 | 3/2005 | Sato | |
| 2005/0165925 A1 * | 7/2005 | Dan et al. | 709/224 |
| 2005/0188075 A1 * | 8/2005 | Dias et al. | 709/224 |
| 2006/0031648 A1 * | 2/2006 | Ishikawa et al. | 711/162 |
| 2006/0031649 A1 | 2/2006 | Murotani et al. | |
| 2006/0130042 A1 * | 6/2006 | Dias et al. | 717/168 |

(Continued)

OTHER PUBLICATIONS

Burtscher, Martin, et al., "Prediction Outcome History-based Confidence Estimation for Load Value Prediction," Department of Computer Science, University of Colorado., Journal of Instruction-Level Parallelism 1, published May 1999, p. 1-25.*

(Continued)

*Primary Examiner* — Pierre-Michel Bataille
(74) *Attorney, Agent, or Firm* — McKeon, Meunier, Carlin & Curfman, LLC

(57) ABSTRACT

Technologies are described for implementing a system that schedules background workflows in a storage system. Historical load statistics can be analyzed to estimate the preferred times in the future during which to schedule background workflows. After collecting load statistics related to the storage system, natural cyclical patterns in the load data can be determined as the predominant periodicities of the load data are selected from peaks in an autocorrelation of the collected data. A linear predictor may be formed as a weighted sum of the historical data sampled at the determined periodicities. Error minimization, such as the method of least squares, may be used to determine the values of the weighting in order to minimize an error between the load predictor and the measured load. Predicting future loads can improve the scheduling of background operations by avoiding conflicts with normal system operations.

14 Claims, 7 Drawing Sheets

U.S. PATENT DOCUMENTS

2006/0243056 A1* 11/2006 Sundermeyer et al. ......... 73/760
2006/0248273 A1   11/2006 Jernigan et al.
2008/0104343 A1    5/2008 Miyagaki et al.
2008/0320247 A1   12/2008 Morfey et al.

OTHER PUBLICATIONS

U.S. Appl. No. 12/101,236, filed Apr. 11, 2008, entitled "Data Migration Between Multiple Tiers in a Storage System Using Age and Frequency Statistics," Inventors: Chatterjee et al.

U.S. Appl. No. 12/101,238, filed Apr. 11, 2008, entitled "Data Migration Between Multiple Tiers in a Storage System Using Pivot Tables," Inventors: Chatterjee et al.

U.S. Appl. No. 12/101,251, filed Apr. 11, 2008, entitled "Allocating Background Workflows in a Data Storage System Using Historical Data," Inventors: Chatterjee et al.

U.S. Official Action dated Oct. 28, 2010 in U.S. Appl. No. 12/104,135.

U.S. Official Action dated Dec. 2, 2010 in U.S. Appl. No. 12/104,123.

U.S. Official Action dated Dec. 22, 2010 in U.S. Appl. No. 12/101,236.

* cited by examiner

ALLOCATING BACKGROUND WORKFLOWS IN A DATA STORAGE SYSTEM USING AUTOCORRELATION

CROSS-REFERENCE TO RELATED APPLICATIONS

This application claims the benefit of U.S. provisional patent application No. 60/923,226, filed on Apr. 13, 2007, and entitled "Novel Method of Providing Quotas to Schedule Background Workflows in a Storage System Using Autocorrelation" which is expressly incorporated herein by reference in its entirety.

BACKGROUND

A virtualized cluster is a cluster of different storage nodes that together expose a single storage device. Input/output (I/O) operations sent to the cluster are internally re-routed to read and write data to the appropriate locations. In this regard, a virtualized cluster of storage nodes can be considered analogous to collection of disks in a Redundant Array of Inexpensive Disks (RAID) configuration, since a virtualized cluster hides the internal details of the cluster's operation from initiators and presents a unified device instead.

A virtualized cluster can field I/Os from one or more initiators. In addition to servicing these initiator I/Os, the system processes internal operations including I/O operations. Such operations can be processed in the background to provide functionality such as data migration, adaptive network compression, boot data analysis, volume mirroring, defragmentation, or other internal maintenance operations. These background operations can compete with initiator I/O operations for resources such as disk access, CPU cycles, memory, network bandwidth, and so on. If the background operations are scheduled during a period of very high I/O activity from initiators, a drop in performance may be experienced as decreased throughput and increased latency of the storage system.

However, storage systems do not generally run at full load all the time. Instead, the load on a storage system can fluctuate with usage patterns of end users and the applications that store and access data in the storage system. More often than not, these patterns conform to human patterns, with the load on data systems often peaking during working hours, and having lulls during nights and weekends. Additionally, there may be patterns that recur on a weekly basis, such as a higher load every Friday, or on a monthly or yearly basis.

Predicting the amount of load that is expected on the system during various time periods in the future can provide for intelligent scheduling of background operations. Improved allocation of background operations may reduce system overload and also may reduce the impact on production performance. For example, background operations may be intelligently scheduled to coincide with periods of otherwise low system load.

It is with respect to these considerations and others that the disclosure made herein is presented.

SUMMARY

Technologies are described herein for implementing a system that schedules background workflows in a storage system. The background workflows may be automated maintenance tasks that perform adaptive network compression, boot data analysis, data migration, disk mirroring, or other tasks that may otherwise compete with normal data storage operations for various storage system resources. Historical load statistics for the system can be collected and maintained. The historical load data can be analyzed to estimate preferred times in the future for scheduling background workflows. Data access statistics can be collected over the course of several days on an hourly granularity. Similar statistics may also be collected over the course of months or years on a weekly granularity.

According to one embodiment, the major cycles, or predominant periodicities, in the historical load data may be identified from the time intervals that correspond to peaks in an autocorrelation of the historical load data. These extracted predominant periodicities can provide the basis of a linear predictor of future system load. These periodicities can be said to have the maximum effect on the instantaneous load.

According to another embodiment, the load on the system may be modeled as a linear predictor. The linear predictor may be based on a weighted linear combination of the historical load data sampled at the extracted predominant periodicities. The weights may be established by minimizing the error of the predictor with respect to the weights. Once determined, the error minimizing weights may be used in the linear predictor, along with the extracted predominant periodicities, to estimate future system loads on the storage system.

According to yet another embodiment, a background workflow quota can be provided for a given future period. This quota can represent the maximum number of background operations that can be performed with reduced impact on primary I/O operations, such as initiator data access. A peak load can be detected for the system. Such a peak load can serve as a proxy for the practical maximum of operations supported by the system. The system load for can be estimated using the linear predictor. A permitted background load can be calculated by subtracting the estimated load from the peak load. When the permitted load is determined in capacity per time units it can be converted to a number more specific to the resources being allocated. In a data migration example, a number of migrations per hour may be determined by factoring in the size of a territory and the fact that a migration requires a double access to both read and write the data to be migrated. One example of allocating background operations is to specify a quota, or maximum, of operation, for example a maximum of storage territories that may be migrated.

Moreover, reducing the likelihood of background operations occurring during periods of high initiator load on the data storage system may improve the average performance of the system. Additionally, the load on the underlying storage devices may be leveled or more evenly distributed over time. Such load balancing over time may contribute to longer average disk life.

It should be appreciated that the above-described subject matter may also be implemented as a computer-controlled apparatus, a computer process, a computing system, or as an article of manufacture such as a computer-readable medium.

These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to allocating background workflows in a data storage system using historical data. Through the use of the embodiments presented herein, historical load statistics can be analyzed to estimate the preferred times in the future during which to schedule background workflows. Predicted future loads can improve the scheduling of background operations to avoid conflicts with normal system operations.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for allocating background workflow in a data storage system using historical load data will be described.

Figure 1:
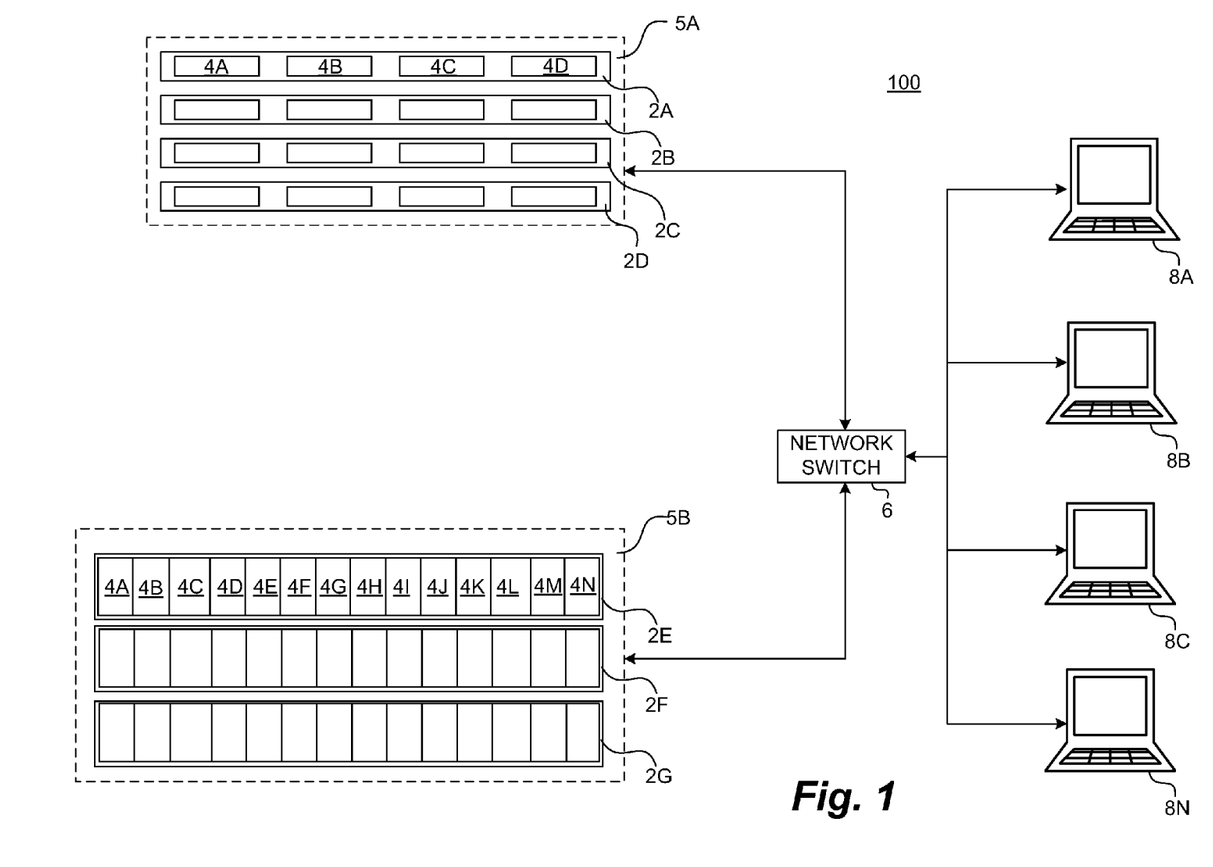
FIG. 1 is a network architecture diagram illustrating aspects of a storage system that includes several virtualized clusters according to one exemplary embodiment.

Turning now to FIG. 1, details will be provided regarding an illustrative operating environment for the implementations presented herein, as well as aspects of several software components that provide the functionality described herein for implementing data migration in a multitier storage system using age and frequency statistics. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
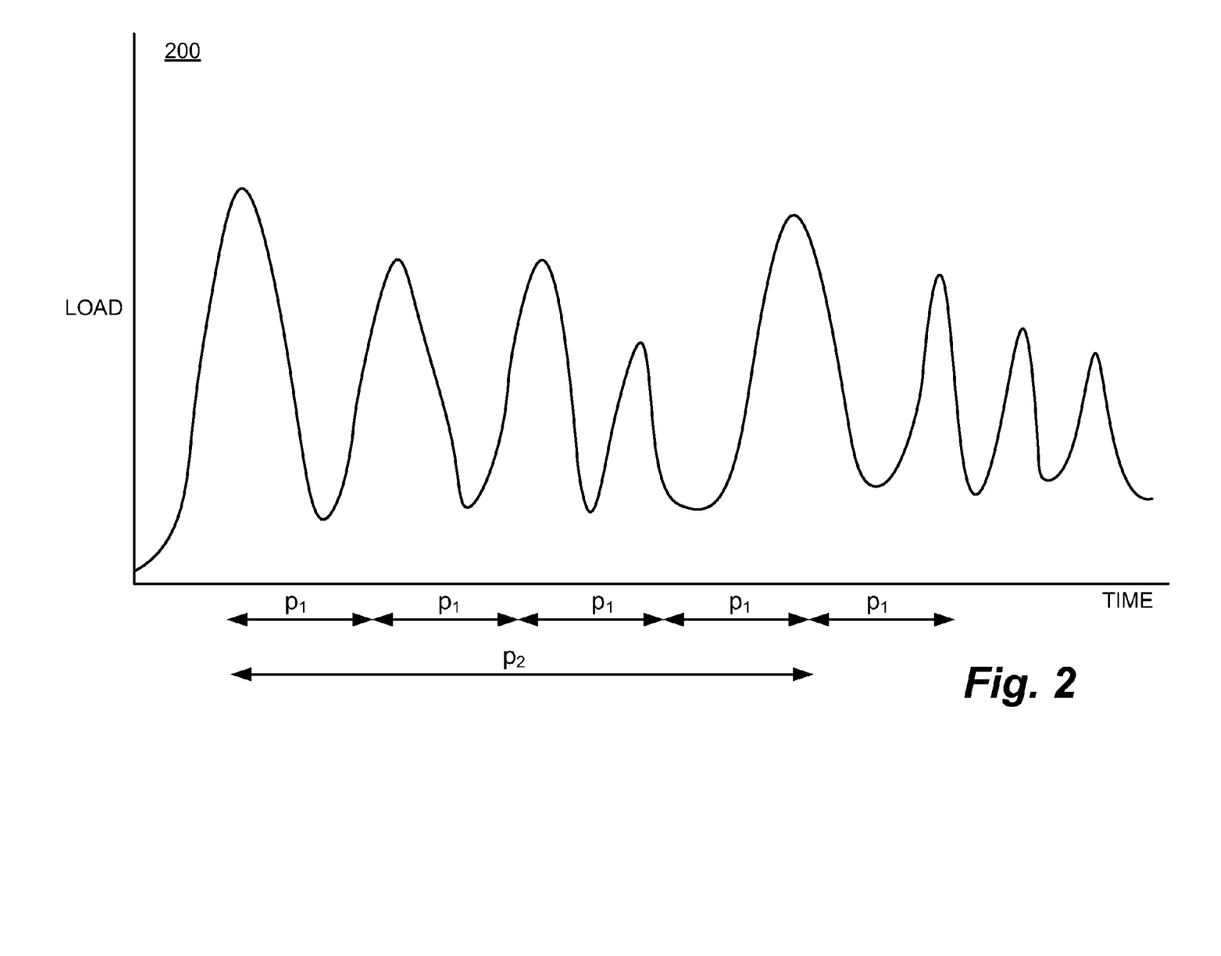
FIG. 2 is a statistical plot illustrating periodicities in system load statistics of a data storage system according to one exemplary embodiment.

Referring now to FIG. 2, a statistical plot illustrates periodicities in system load statistics over time within a data storage system according to one exemplary embodiment. The horizontal axis of the plot 200 represents time and the vertical axis represents the load. The load can encompass any combination of various parameters such as CPU utilization, memory utilization, network bandwidth load, or I/O load. Theoretically, the best time to process background operations may be when the load on the system is minimal. Thus, the various background modules or plug-ins can have system resources allocated to them during a low period in the load as opposed to during peak times of the system load.

It can be assumed that the load on the system may be a direct function of the load in the past. That is, the load for a future period can be predicted, in a statistical sense, by examining loads from the historical load data. More specifically, the system load may be a superposition of various periodic loads. These periodic loads may correspond to a particular human-centric periodicity. For example, over the course of a day, roughly periodic troughs and peaks in the load may be observed depending, for example, on when employees come to work and when they leave. Over the course of a week, periods of relaxed load such as nights and weekend may be observed. Over the course of a year, certain days may be holidays year after year and display low loading. In this manner, an expected system load can be predicted, or estimated, from cyclical patterns found in past system loads.

The load shown in the plot 200 can display a periodicity $p_1$ as seen from the cyclical nature of the data in the plot. There may also be another periodicity $p_2$ based on the relative amplitudes of the peaks in the data. The load data in the plot is only an example to illustrate system load. Actual system loads may be more complex and the extraction of the periodicities may not be visually obvious. The period for $p_2$ may be longer than the period for $p_1$. System load, with such periodicities, may be generated, for example, by an organization that has daily peaks in system usage when employees are at work, but has a larger peak in load every fourth day when several large data sets are scheduled to be processed. As such, $p_i$ may correspond to 24 hours and $p_2$ may correspond to 4 days.

It could be assumed that natural cycles in load data usually occur at periodicities of hours, working shifts, days, weeks, and years. However, a the load prediction system may be more autonomous and robust if instead of preselecting such periodicities, the predominant periodicities of the data are mathematically determined from the actual collected data. The natural cycles, or predominant periodicities, of the data may be determined from the peaks in an autocorrelation of the data. Autocorrelation can be described as the correlation of a function to itself. As such, the autocorrelation function peaks at times when the function correlates the highest with itself, or when it may be the most self-similar. Put more simply, peaks in an autocorrelation of a function can identify cycles in the function where patterns may be, to some extent, repeated.

In many systems, there may always be some load on the system and only the magnitude of the load may vary from lows to highs in a somewhat cyclical fashion. Hence, waiting for a time with no load in order to perform background tasks may not be possible or efficient. One approach may be to allocate background workflows at all times while scheduling more background work at low points in the system load and less background work during peaks in the system load.

The total work capacity of the system can be estimated. For example, the highest recent peak, or a local maxima, in the load data can serve as a proxy for the total work capacity of the system. Subtracting the expected load from this peak capacity can predict the available system capacity during some period in the future for which the expected load was predicted.

Figure 3:
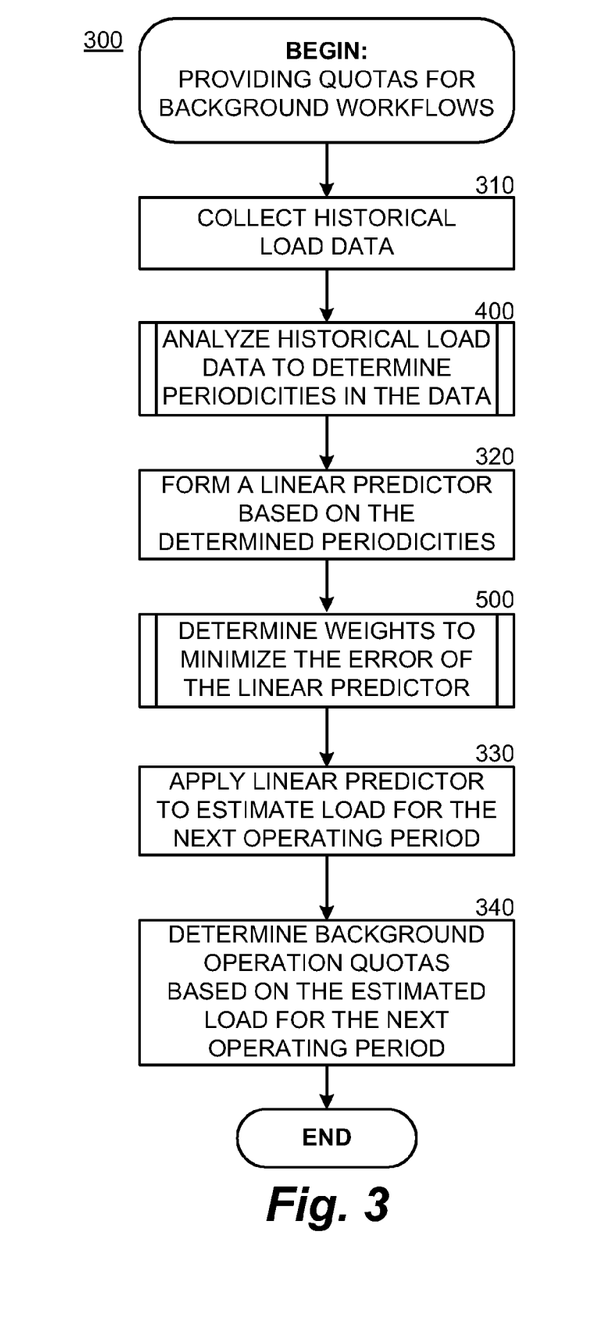
FIG. 3 is a logical flow diagram illustrating a process performed by a data storage system for providing quotas for background workflows according to one exemplary embodiment.

Turning now to FIG. 3, additional details will be provided regarding the embodiments presented herein for allocating background workflows in a data storage system. In particular, FIG. 3 is a flow diagram showing a routine 300 that illustrates aspects of an exemplary process performed by a storage system for providing quotas for background workflows. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 300 can be part of a workflow module that determines when to perform certain background tasks. For example, data migration, restriping, defragmentation, and so forth. The determination of permitted background load can be made periodically. For example, the permitted background load may be determined once per hour to allocate resources to background threads or modules for the next hour. Other time period granularities may be used as well.

The routine 300 can begin with operation 310 where historical load data is collected. The load data can be collected on a fixed periodic cycle. For example, every hour. At operation 400 the historical load data that has been collected can be analyzed to determine natural periodicities within the data. The extraction of load periodicities from the historical data may be implemented as a subroutine 400. Additional detail related to subroutine 400 is discussed with respect to FIG. 4. The extracted periodicities can have units of time and may be represented a sequence of time periods in the form:

$$p_1, p_2, p_3, \ldots p_N.$$

At operation 320, a linear predictor can be formed based on the determined periodicities. It is to be understood that any number of periodicities, and thus any number of terms, may be used in the linear predictor. However, only the three most predominant periodicities are shown in some examples discussed herein, for the sake of simplicity. Representing the historical load data as x(t), where the load at any time t may be given as x(t), the linear predictor for the estimated load may be given as:

$$\hat{x}(t) = w_1 x(t-p_1) + w_2 x(t-p_2) + w_3 x(t-p_3).$$

The predictor function may be referred to as x-hat and can represent an estimate of x(t) based upon shifting the function x(t) by three different periods, weighting the three time-shifted copies of x(t) and then adding the three terms together. The weights are given as $w_1$, $w_2$, and $w_3$. Operation 500 may be represented as a subroutine that can determine the values of the weights for the linear predictor. Setting of the weights can be considered a tuning step for the predictor. Additional details related to determining the weight values are discussed with respect to FIG. 5 below.

At operation 330, the linear predictor x-hat may be applied to predict the load for the next operating period. The predictor x-hat may be built upon the periodicities determined by subroutine 400 and the weights determined by subroutine 500. By operating the predictor function at the time $t_{NEXT}$ for the next operating period, the estimated load for that period may be predicted as:

$$\hat{x}(t_{NEXT}).$$

At operation 340, the permitted load for establishing background operation quotas can be established by subtracting the expected load from a peak load. That is, the amount of permitted background load may be determined by calculating the maximum possible load minus the expected load as determined in operation 330. The permitted background load can be subjected to predetermined minimum and maximum permitted load limits. This can insure that there are always at least a minimum amount of system resources dedicated to the background operations and also that the system is never overly dedicated to performing only background operations. The imposing of minimum and maximum permitted background loads may be optional. The routine 300 may terminate after operation 340.

The peak load of the system can be established by examining the historical load data to find a recent peak load, or local maxima, during a time period. For example, the time period may be over the last week. This actual peak load can serve as a proxy for the maximum load of the system. Since the peak can be determined from real production loads, it may be a more reasonable estimate of the maximum allowable load given the particular kind of load that the system is subjected to. For example, when considering I/O specific loads, the typical mix of random access versus sequential access I/O operations. The peak load, in terms of I/O loading, may be determined as a data rate such as MB/s (megabytes per second) or as a more aggregated rate such as sectors per second. Other types of system loading may be addressed in terms of the appropriate units, such as instruction counts, machine cycles, memory consumption, other similar quantities, or any combinations thereof.

For background operations affecting I/O loads, the permitted load can be translated from the original MB/s or sectors per second into territories per hour. This permitted load in territories per hour can be provided, for example, to a data migration module as a maximum number of territories to be migrated over the next hour. This may be referred to as the data migration quota. Where the load data is maintained on a per-volume basis, the total permitted load may be determined for all volumes in a given container or in the storage system.

A storage resource management (SRM) module can operate periodically, for example every hour, to manage the allocation of background workflow to various other modules or plug-ins. For example, data migration modules may be supplied with quotas offering each module an opportunity to move a set number of territories. If a module is unable to make use of its allocated number of data migrations, the quota of other modules or plug-ins may be increased. Additional details regarding workflow allocation to modules and plug-ins is discussed with respect to FIG. 6.

Although aspects specific to the example background operations of a data migration module, such as territory quotas and I/O loads, are discussed herein, it should be appreciated that data migration is only one example of a module performing background operations. Furthermore, the workflows of various other background threads or plug-in modules can be allocated using the technology discussed herein, as the permitted loads that are calculated can related to not only I/O loads, but also system loads on memory, CPU cycles, network bandwidth, caching, and so forth. The type of system loading to be considered may vary based on the system demands of the respective background operation for which resources are being allocated.

The linear predictor periodicities and weights may be periodically reestablished in order to dynamically track changes in the evolving load patterns on the storage system. While linear prediction functions are discussed, the predictor function, or load estimator function, may also have a zeroth term weight thus forming an affine prediction function. Various other nonlinearities may also be introduced into the predictor function without departing from the spirit or scope of the technologies discussed herein.

Figure 4:
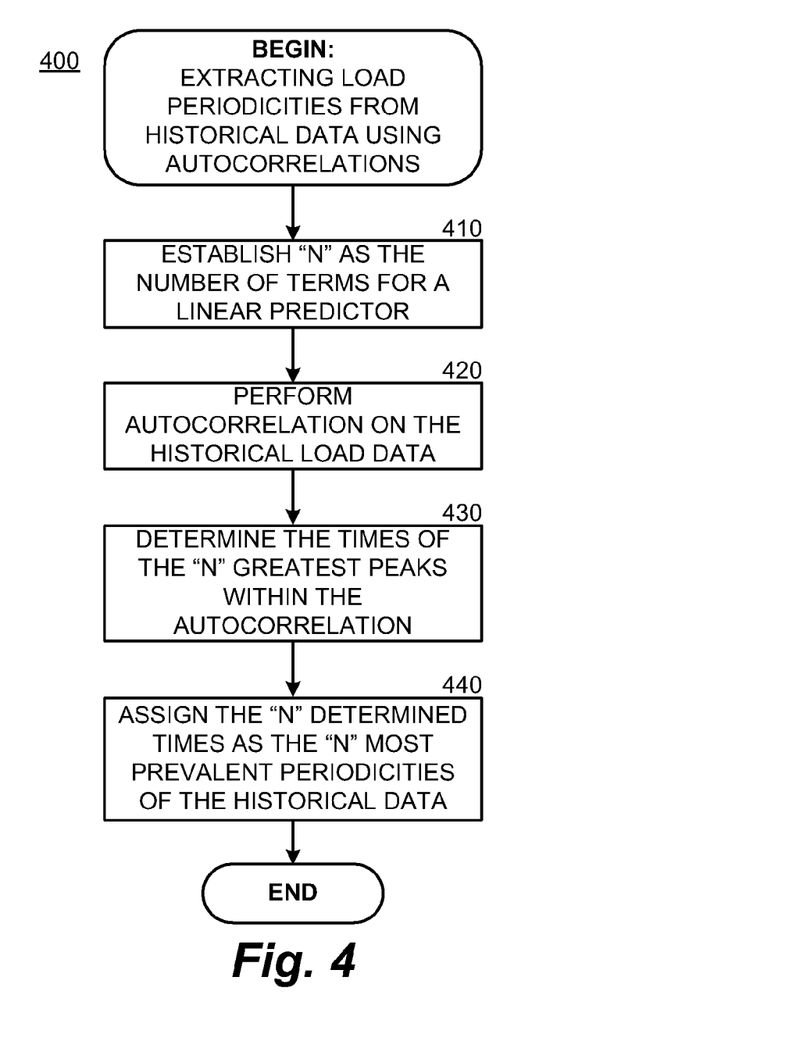
FIG. 4 is a logical flow diagram illustrating a process performed by a data storage system for extracting load periodicities from historical load data using autocorrelation according to one exemplary embodiment.

Turning now to FIG. 4, additional details will be provided regarding the embodiments presented herein for allocating background workflows in a data storage system. In particular, FIG. 4 is a flow diagram illustrating a routine 400 that shows aspects of an exemplary process performed by a storage system for extracting load periodicities from historical load data using autocorrelation. The routine 400 can begin with operation 410 where the number of terms, N, to be used in a linear predictor can be established. As discussed above, N is taken to be three in some examples discussed herein. However, N can be specified as any number of terms depending upon the desired complexity of the linear predictor. Since each term of the linear predictor is based upon one of the extracted periodicities, N is also the number of periodicities that can be extracted from the data set. The N most predominant periodicities within the historical load data can be determined.

At operation 420, the autocorrelation function of the historical load data can be computed. Again assuming that the load at any instance of time t is x(t), the autocorrelation may be given by:

$$R_{xx}(t) = \sum_{n=-\infty}^{\infty} x(n) \cdot x(n-t).$$

At operation 430, the N most prominent peaks, or highest values, may be selected from the autocorrelation function Rxx(t). The N times where these peaks occur may then be determined. In other words, N times can be determined where Rxx(t) has the greatest values when t equals those N times. These determined times may correspond, by the nature of the autocorrelation, to the time shifts of the load data x(t) where the data is the most self-similar. For example, if the load on the system is similar at 8 AM of each day, then one of the times determined may correspond to 24 hours, as 24 hours may be a natural period occurring within the data set. At operation 440, the N times determined in operation 430 can be assigned as the N most prevalent periodicities within the data given by:

$$p_1, p_2, p_3, \ldots p_N.$$

The routine 400 may terminate after operation 440.

Figure 5:
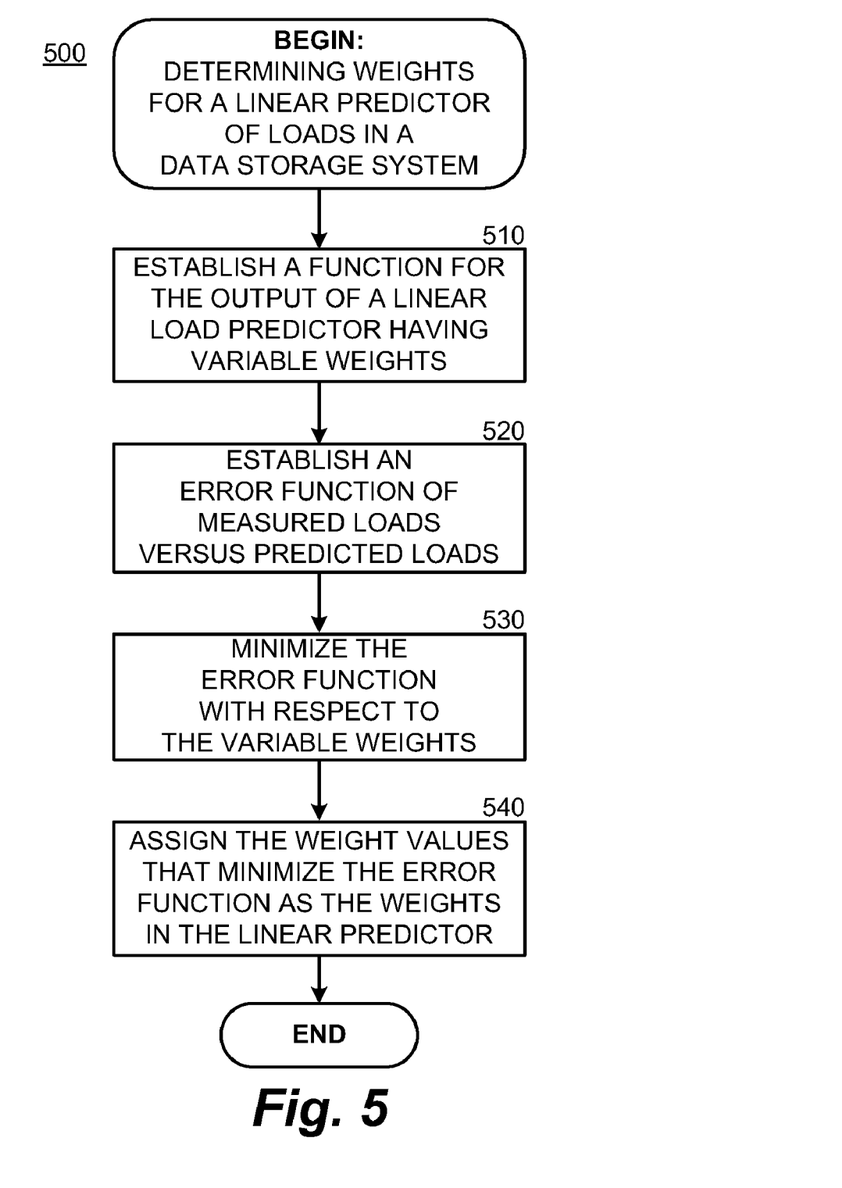
FIG. 5 is a logical flow diagram illustrating a process performed by a data storage system for determining weights for a linear load predictor in a data storage system according to one exemplary embodiment.

Turning now to FIG. 5, additional details will be provided regarding the embodiments presented herein for allocating background workflows in a data storage system. In particular, FIG. 5 is a flow diagram illustrating a routine 500 that shows aspects of an exemplary process performed by a storage system for determining weights for a linear predictor of system load in a data storage system. The routine 500 can begin with operation 510 where the function of a linear predictor having variable weights may be established. As discussed above, the linear predictor may be given as:

$$\hat{x}(t) = w_1 x(t-p_1) + w_2 x(t-p_2) + w_3 x(t-p_3).$$

The weights are provided by the variables $w_1$, $w_2$, and $w_3$ in the linear predictor function.

At operation 520, an error function can be established. The error function can measure the error between the predicted load and the measured load. For example, the method of Least Squares may be used to define the error between the estimated load and the load as:

$$\varepsilon(t) = [x(t) - \hat{x}(t)]^2$$
$$= [x(t) - (w_1 x(t-p_1) + w_2 x(t-p_2) + w_3 x(t-p_3))]^2$$

As such, the error may be the measured load data itself, x(t), minus the estimated load data x-hat(t). The error difference may be squared to make positive and negative errors all positive thus providing consistent relative magnitudes in the errors.

At operation 530, the error function can be minimized with respect to the variable weights. That is, the weights ($w_1$, $w_2$ and $w_3$) can be determined that make the error between the measured load and the predicted, or estimated, load as small as possible. One method for minimizing a function with respect to a variable is to differentiate the function with respect to the variable and then find the values of the variable that make the differentiated function zero. When there are multiple variables, the minimum with respect to each variable can be expressed using a partial derivative. When each of the partial derivatives is set to zero, a system of n equations with n unknowns is established. Applying this approach to the error function with respect to each of three weights provides a system of three equations:

$$\frac{\partial \{\sum \varepsilon(t)\}}{\partial w_1} = 0$$

$$\frac{\partial \{\sum \varepsilon(t)\}}{\partial w_2} = 0$$

$$\frac{\partial\left\{\sum \varepsilon(t)\right\}}{\partial w_3} = 0$$

Solving this system of three equations can provide the values of the variable weights that, when used in the linear predictor, minimize the error between the predicted load and the measured load. A system with several terms in its linear predictor, and thus several periodicities, will have several weights and require a system of several equations to be solved. Various mathematical techniques, such as Levinson-Durbin recursion, may be used for solving the system of equations. At operation 540, the determined weight values may be assigned as the weights to be used in the linear load predictor. The routine 500 may terminate after operation 540.

Figure 6:
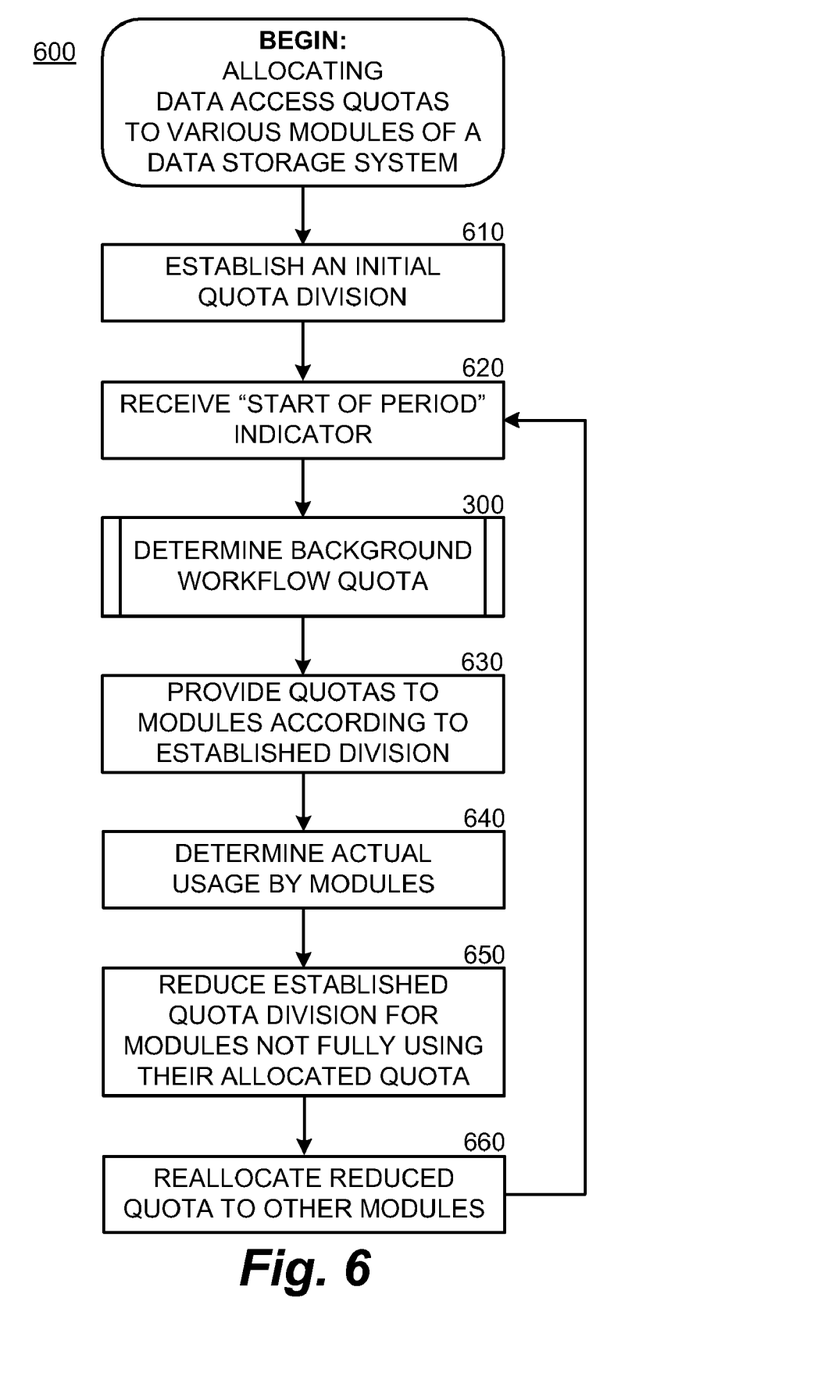
FIG. 6 is a logical flow diagram illustrating a process performed by a data storage system for allocating background workflow quotas to various modules of a data storage system according to one exemplary embodiment.

Turning now to FIG. 6, additional details will be provided regarding the embodiments presented herein for allocating background workflows in a data storage system. In particular, FIG. 6 is a flow diagram illustrating a routine 600 that shows aspects of an exemplary process performed by a storage system for allocating background workflow quotas to various modules of a data storage system. The quotas may be for a maximum number of data access operation, or a maximum amount of memory usage, or a maximum network load, or any other quota of system resources depending upon the demands of the module or plug-in consuming the system resources. The routine 600 can begin with operation 610 where an initial quota division is established. The initial division may simply be to an equal division of the total quota between the modules. At operation 620, a start of period indicator can trigger the periodic allocation of available quota. The indicator may be a timer, a timer interrupt, a counter, a signal from a real-time clock, or any other mechanism for triggering a periodic event.

After a background workflow quota is provided by routine 300, as discussed in detail with respect to FIG. 3, operation 630 can divide the total background workflow according to the established quota division. The respective quotas after the division may be allocated to the individual modules. At operation 640, the actual resources used by each module can be monitored or reported back from the modules. This can determine if the quota portion allocated to each respective module was totally consumed or if any of the allocated resources went unused. At operation 650, the established quota division may be reduced for any modules that did not make full use of their allocated quotas. At operation 660 the reduction in quotas made in operation 650 may be reallocated to other modules. Thus, a reasonable division of quotas may be established over time. There may be an absolute minimum beyond which any quota division is not allowed to be reduced. For example, 10% of the total quota may be guaranteed to each of the modules, at a minimum, to ensure that no module can ever get starved out of resources simply for not using resources in the prior period. After operation 660, the routine 600 may loop back to operation 620 to await the start of period indicator for the next period of allocating background resources to modules.

Figure 7:
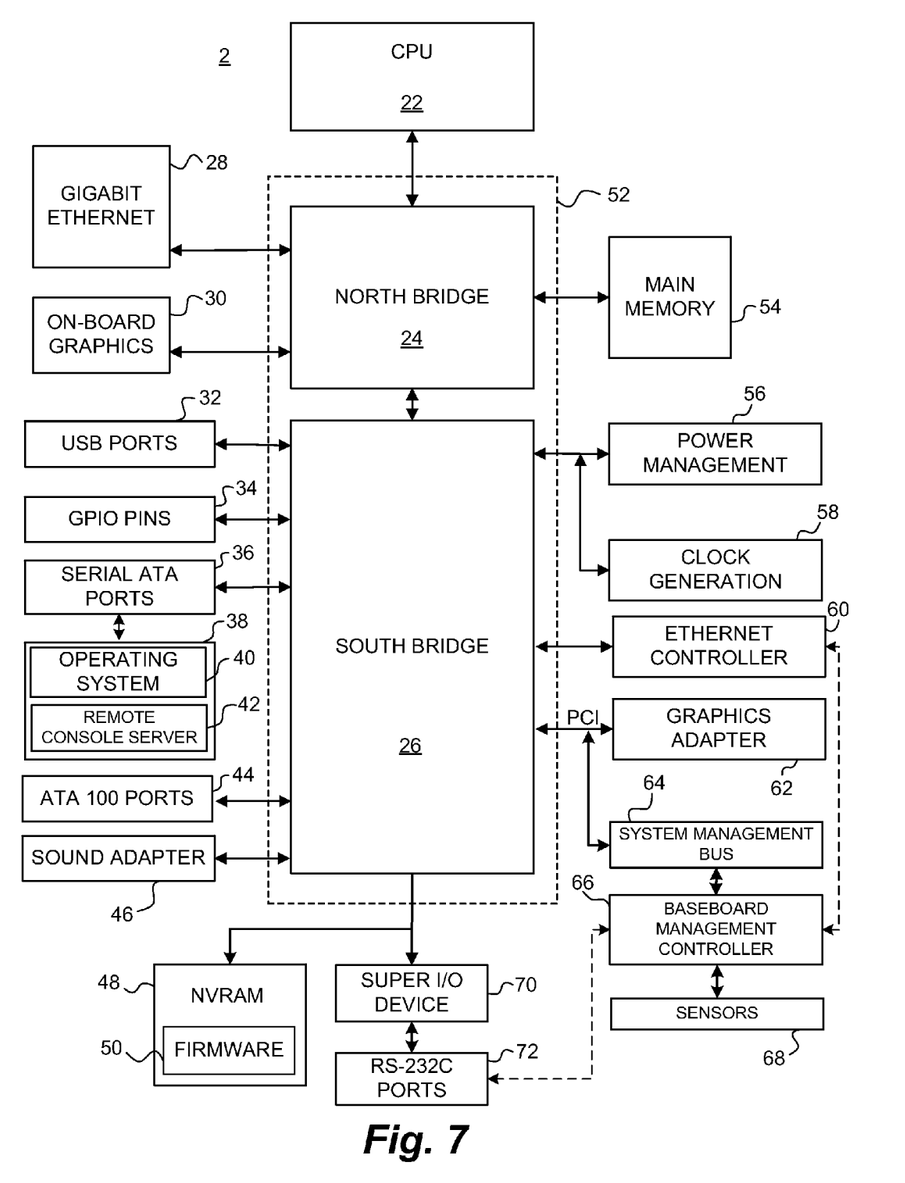
FIG. 7 is a computer architecture diagram illustrating a computer hardware architecture for a computing system capable of serving as a storage node according to one exemplary embodiment.

FIG. 7 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 7 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 7, may include other components that are not explicitly shown in FIG. 7, or may utilize an architecture completely different than that shown in FIG. 7.

Based on the foregoing, it should be appreciated that technologies for allocating background workflows in a data storage system using a predictor of system load are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for allocating background workflows in a storage system, the method comprising:
   maintaining historical load data related to the storage system;
   extracting periodicities from the history load data;
   establishing a load predictor function based on the extracted periodicities, wherein establishing the load predictor function comprises providing an error function to define the error between a predicted load and a measured load and selecting a weight for each extracted periodicity in the load predictor function to minimize the error function;

applying the load predictor function to determine an expected load; and calculating a permitted background load by subtracting the expected load from a peak load.

2. The method of claim 1, wherein extracting periodicities comprises identifying peaks in an autocorrelation of the historical load data.

3. The method of claim 1, wherein the load predictor function is a linear predictor.

4. The method of claim 1, further comprising allocating workflows to modules using an established division of the permitted background load.

5. The method of claim 4, wherein the established division of the permitted background load is adapted based on demand from the modules.

6. A data storage system comprising:

a storage subsystem;

a plurality of physical storage devices associated with the storage subsystem; and one or more workflow modules operable to cause the storage subsystem to:

maintain historical load data related to the storage system;

extract periodicities from the history load data;

establish a load predictor function based on the extracted periodicities, wherein the load predictor function is established by providing an error function to define the error between a predicted load and a measured load and selecting a weight for each extracted periodicity in the load predictor function to minimize the error function;

apply the load predictor function to determine an expected load; and calculate a permitted background load by subtracting the expected load from a peak load.

7. The data storage system of claim 6, wherein extracting periodicities comprises identifying peaks in an autocorrelation of the historical load data.

8. The data storage system of claim 6, wherein the load predictor function is a linear predictor.

9. The data storage system of claim 6, further causing the storage subsystem to allocate workflows to modules using an established division of the permitted background load.

10. A computer storage medium having computer-executable instructions stored thereon which, when executed by a computer system, cause the computer system to:

maintain historical load data related to the storage system;

extract periodicities from the history load data;

establish a load predictor function based on the extracted periodicities, wherein the load predictor function is established by providing an error function to define the error between a predicted load and a measured load and selecting a weight for each extracted periodicity in the load predictor function to minimize the error function;

apply the load predictor function to determine an expected load; and calculate a permitted background load by subtracting the expected load from a peak load.

11. The computer storage medium of claim 10, wherein extracting periodicities comprises identifying peaks in an autocorrelation of the historical load data.

12. The computer storage medium of claim 10, wherein the load predictor function is a linear predictor.

13. The computer storage medium of claim 10, further causing the computer system to allocate workflows to modules using an established division of the permitted background load.

14. The computer storage medium of claim 13, wherein the established division of the permitted background load is adapted based on demand from the modules.

* * * * *